United States Patent
Yamamoto et al.

(10) Patent No.: US 12,275,481 B2
(45) Date of Patent: Apr. 15, 2025

(54) INVERTED PENDULUM TYPE VEHICLE, VEHICLE CONTROL SYSTEM, VEHICLE CONTROL METHOD, AND NON-TRANSIENT COMPUTER-READABLE RECORDING MEDIUM

(71) Applicant: Honda Motor Co., Ltd., Tokyo (JP)

(72) Inventors: Sachiko Yamamoto, Saitama (JP); Shinichiro Kobashi, Saitama (JP); Misato Echizenya, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 236 days.

(21) Appl. No.: 17/982,455

(22) Filed: Nov. 7, 2022

(65) Prior Publication Data
US 2023/0166806 A1  Jun. 1, 2023

(30) Foreign Application Priority Data
Nov. 30, 2021  (JP) .................. 2021-194525

(51) Int. Cl.
*B62K 11/00* (2006.01)
*B62K 1/00* (2006.01)
*G05D 1/43* (2024.01)

(52) U.S. Cl.
CPC .............. *B62K 11/007* (2016.11); *B62K 1/00* (2013.01); *G05D 1/43* (2024.01)

(58) Field of Classification Search
CPC ........ B62K 11/007; B62K 1/00; B62K 11/00; B62J 1/08; B60W 40/13; B60L 58/18; G01C 21/362; A01D 90/10; G01P 3/481
See application file for complete search history.

(56) References Cited

U.S. PATENT DOCUMENTS

| | | | | |
|---|---|---|---|---|
| 5,326,118 A | * | 7/1994 | DeRosa | B62K 1/00 482/66 |
| 2014/0058600 A1 | * | 2/2014 | Hoffmann | B60L 58/18 180/21 |
| 2017/0088212 A1 | * | 3/2017 | Edney | B60W 40/13 |
| 2022/0227445 A1 | * | 7/2022 | Guo | B62J 1/08 |

FOREIGN PATENT DOCUMENTS

| | | | | | |
|---|---|---|---|---|---|
| JP | 2003177025 A | * | 6/2003 | ........... | G01C 21/362 |
| JP | 2014203094 | | 10/2014 | | |
| JP | 2018127882 A | * | 8/2018 | ............. | A01D 90/10 |
| KR | 100631467 B1 | * | 10/2006 | ............. | G01P 3/481 |

* cited by examiner

*Primary Examiner* — Yuri Kan
(74) *Attorney, Agent, or Firm* — JCIPRNET

(57) ABSTRACT

The disclosure allows an occupant to control a vehicle as needed for the vehicle that automatically moves to a destination. An inverted pendulum type vehicle that travels while balancing an inverted pendulum type body includes: an operation input part that receives a driving operation of its own vehicle by a weight shift of an occupant; and a movement control part that causes the own vehicle to start automatic movement on a predetermined route at a predetermined time. The movement control part allows the own vehicle to deviate from the predetermined route and travel in a second direction when a weight shift greater than a threshold value is performed in the second direction other than a traveling direction related to the predetermined route during execution of the automatic movement.

20 Claims, 12 Drawing Sheets

INVERTED PENDULUM TYPE VEHICLE, VEHICLE CONTROL SYSTEM, VEHICLE CONTROL METHOD, AND NON-TRANSIENT COMPUTER-READABLE RECORDING MEDIUM

CROSS-REFERENCE TO RELATED APPLICATION

This application claims the priority benefit of Japan application serial No. 2021-194525, filed on Nov. 30, 2021. The entirety of the above-mentioned patent application is hereby incorporated by reference herein and made a part of this specification.

BACKGROUND

Technical Field

The disclosure relates to an inverted pendulum type vehicle, a vehicle control system, a vehicle control method, and a non-transient computer-readable recording medium recording a program.

Related Art

Conventionally, in order to make effective use of all touring time, there is an event information notification system that conveys the status of exhibitor's distribution inventory information and waiting queue congestion information to users in real time (for example, see Patent Literature 1). In addition, conventionally, an automatic driving technology for automatically controlling the driving of a moving body such as a vehicle has been developed. By combining such an event information notification system and automatic driving technology, it is considered to provide the user with a means of transportation to the destination (for example, the venue of the event) while notifying the user of the event information.

Citation List

Patent Literature

[Patent Literature 1] Japanese Patent Application Laid-Open No. 2014-203094

However, the user may not like that when moving to the destination by the automatic driving of the moving body (hereinafter referred to as "automatic movement"), the movement route is completely determined. For example, there may be a case where the user wants to move freely to some extent by his or her own will until he or she arrives at the destination while heading for the destination by automatic movement (for example, heading for the destination while strolling around the route by automatic movement).

The disclosure has been made in consideration of such circumstances, and provides an inverted pendulum type vehicle, a vehicle control system, a vehicle control method, and a non-transient computer-readable recording medium recording a program capable of allowing the occupant to control the vehicle as needed for the vehicle that automatically moves to the destination.

SUMMARY

The inverted pendulum type vehicle, the vehicle control system, the vehicle control method, and the non-transient computer-readable recording medium recording the program according to the disclosure adopt the following configurations.

(1): An inverted pendulum type vehicle according to an embodiment of the disclosure is an inverted pendulum type vehicle that travels while balancing an inverted pendulum type body. The inverted pendulum type vehicle includes: an operation input part that receives a driving operation of its own vehicle by a weight shift of an occupant; and a movement control part that causes the own vehicle to start automatic movement on a predetermined route at a predetermined time. The movement control part allows the own vehicle to deviate from the predetermined route and travel in a second direction when a weight shift greater than a threshold value is performed in the second direction other than a traveling direction related to the predetermined route during execution of the automatic movement.

(7): A vehicle control system according to an embodiment of the disclosure includes: an event notification part that notifies a user of an event; an event reservation part that receives a participation reservation of the user for the notified event; and the inverted pendulum type vehicle as described above. The movement control part causes the own vehicle to start automatic movement on a predetermined route at a predetermined time according to a holding time of the event, and the event notification part notifies the user of an event according to a preference of the user based on preference information of the user registered in advance.

(8): A vehicle control method according to an embodiment of the disclosure is a vehicle control method for an inverted pendulum type vehicle that travels while balancing an inverted pendulum type body. The vehicle control method includes: receiving a driving operation of its own vehicle by a weight shift of an occupant; performing a movement control process that causes the own vehicle to start automatic movement on a predetermined route at a predetermined time; and in the movement control process, allowing the own vehicle to deviate from the predetermined route and travel in a second direction when a weight shift greater than a threshold value is performed in the second direction other than a traveling direction related to the predetermined route during execution of the automatic movement.

(9): A non-transient computer-readable recording medium according to an embodiment of the disclosure records a program that causes an inverted pendulum type vehicle that travels while balancing an inverted pendulum type body to perform: receiving a driving operation of its own vehicle by a weight shift of an occupant; performing a movement control process that causes the own vehicle to start automatic movement on a predetermined route at a predetermined time;

and in the movement control process, allowing the own vehicle to deviate from the predetermined route and travel in a second direction when a weight shift greater than a threshold value is performed in the second direction other than a traveling direction related to the predetermined route during execution of the automatic movement.

DESCRIPTION OF THE EMBODIMENTS (2): In the above aspect (1), the movement control part facilitates a movement in the traveling direction when the weight shift is performed in the traveling direction during the execution of the automatic movement as compared with a case where the weight shift is not performed in the traveling direction during the execution of the automatic movement.

(3): In the above aspect (1) or (2), the inverted pendulum type vehicle further includes an output part that outputs information in a predetermined mode, and when the own vehicle is executing the automatic movement, the movement control part causes the output part to output notification information for notifying the user of the own vehicle to that effect.

(4): In the above aspect (3), the movement control part causes a display part as the output part to display, as one of the notification information, a direction of the weight shift and a direction of a movement route by the automatic movement in different modes.

(5): In the above aspect (3) or (4), the movement control part causes a display part as the output part to display, as one of the notification information, an end timing of the automatic movement and a remaining distance that the own vehicle travels until an end of the automatic movement.

(6): In any one of the above aspects (3) to (5), the inverted pendulum type vehicle further includes a setting input part that receives an input of an operation for setting whether to cause a display part as the output part to display a part or all of the notification information, and the movement control part switches whether to cause the display part to display a part or all of the notification information according to the input of the operation.

According to the above aspects (1) to (9), it is possible to allow the occupant to control the vehicle as needed for the vehicle that automatically moves to the destination.

Hereinafter, embodiments of an inverted pendulum type vehicle, a vehicle control system, a vehicle control method, and a program of the disclosure will be described with reference to the drawings.

Figure 1:
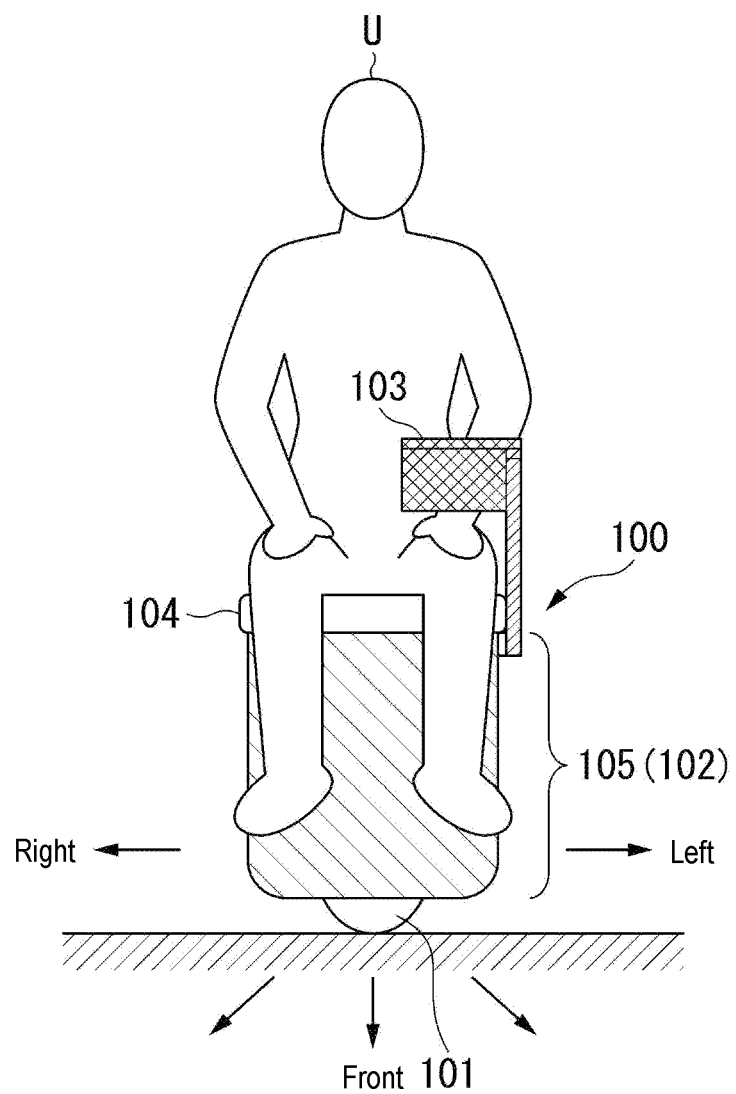
FIG. 1 is a first diagram showing an outline of the appearance of an inverted pendulum type vehicle according to a vehicle control system of this embodiment.
Figure 2:
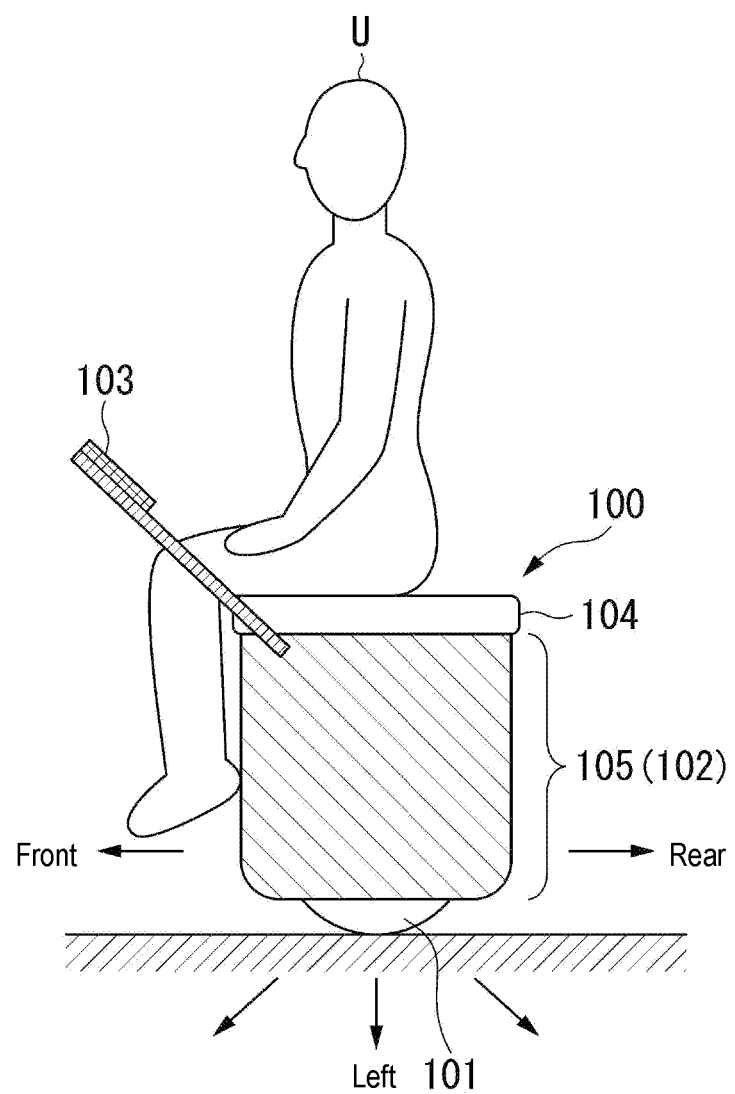
FIG. 2 is a second diagram showing an outline of the appearance of an inverted pendulum type vehicle according to a vehicle control system of this embodiment.

FIG. 1 and FIG. 2 are diagrams showing an outline of the appearance of an inverted pendulum type vehicle 100 according to a vehicle control system 1 of this embodiment. The vehicle control system 1 is a system that guides the inverted pendulum type vehicle 100 to a predetermined destination by controlling the automatic driving of the inverted pendulum type vehicle 100. FIG. 1 shows the appearance seen from the front direction, and FIG. 2 shows the appearance seen from the side direction. The inverted pendulum type vehicle 100 is a vehicle in which a boarding part is provided on a base in which a moving mechanism for moving on the floor surface and a drive device for driving the moving mechanism are assembled, and it is a vehicle configured to change the traveling direction in the tilting direction when a user U (occupant) who has boarded the boarding part tilts his or her body with respect to the vertical direction.

The inverted pendulum type vehicle 100 includes, for example, an omnidirectional moving wheel 101 as a moving mechanism, a drive device 102 for driving the omnidirectional moving wheel 101, an operation panel 103, a boarding part 104, and a base 106 for integrally assembling them. The omnidirectional moving wheel 101 is a wheel that enables the vehicle to immediately advance in any direction (all directions of 360 degrees) from the current position (omnidirectional movement) without performing a preliminary operation such as turning.

Figure 3:
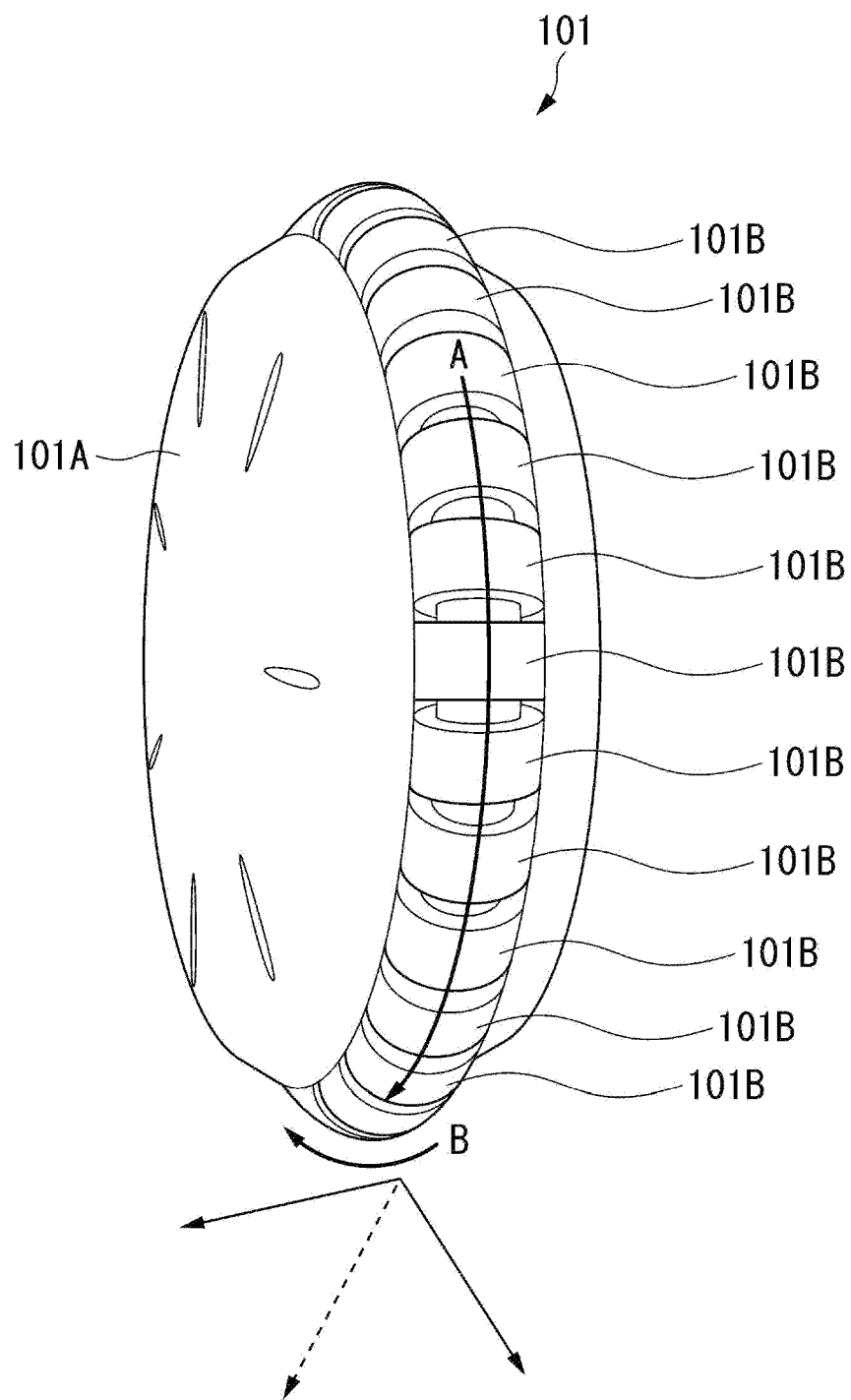
FIG. 3 is a diagram showing an outline of the configuration of the omnidirectional moving wheel.

FIG. 3 is a diagram showing an outline of the configuration of the omnidirectional moving wheel 101. The omnidirectional moving wheel 101 includes, for example, a large diameter wheel 101A and multiple small diameter wheels 101B arranged along the circumference of the large diameter wheel 101A. The large diameter wheel 101A is a wheel that mainly realizes straight-ahead movement in the front-rear direction. The small diameter wheel 101B is a wheel that mainly realizes lateral movement on the spot by rotating in the direction of arrow B about the rotation direction (circumferential direction; arrow A) of the large diameter wheel 101A. The omnidirectional moving wheel 101 is driven by a motor (not shown) that may independently control the rotation of the large diameter wheel 101A and the small diameter wheels 101B. With such a configuration, the omnidirectional moving wheel 101 may move forward/backward, left/right, and diagonally in any direction from the spot.

The inverted pendulum type vehicle 100 may be provided with a turning wheel in addition to the omnidirectional moving wheel 101. For example, the turning wheel may be disposed as a rear wheel of the omnidirectional moving wheel 101, and the direction of the inverted pendulum type vehicle 100 may be changed by rotating on a rotation axis orthogonal to the rotation axis of the large diameter wheel 101A. That is, when only the turning wheel is rotated, the inverted pendulum type vehicle 100 is rotated on the spot, and when the large diameter wheel 101A and the turning wheel are rotated at the same time, the inverted pendulum type vehicle 100 may be turned forward while changing its direction in the traveling direction.

Figure 4:
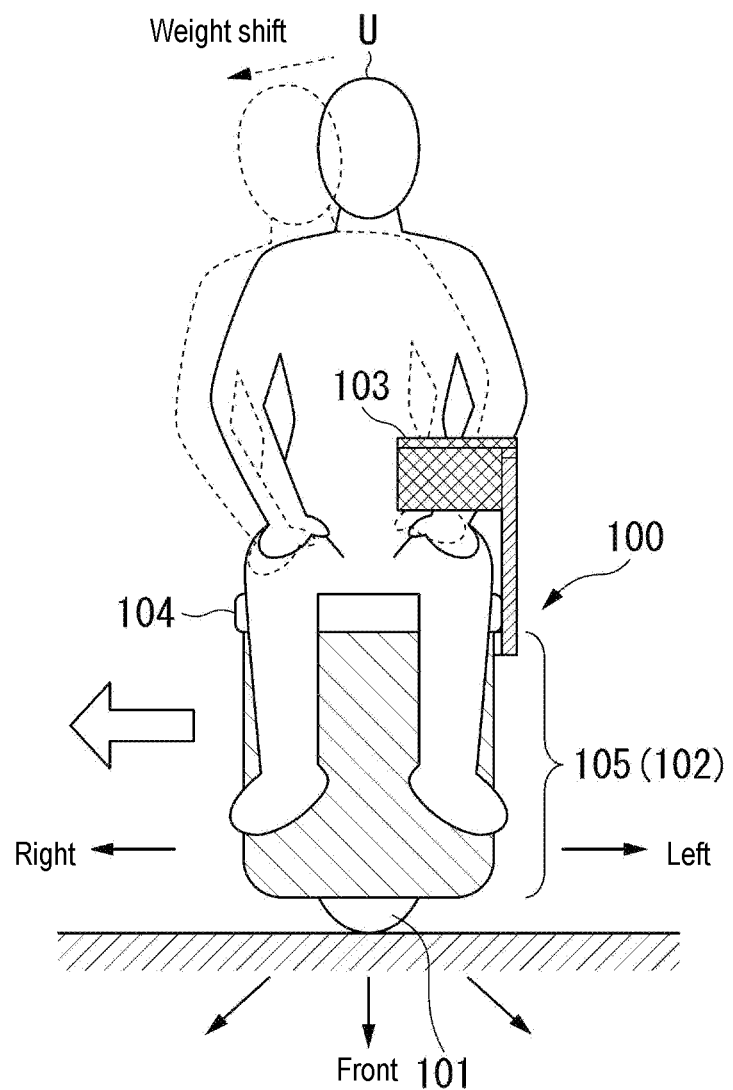
FIG. 4 is a first diagram showing an operation example of the inverted pendulum type vehicle.
Figure 5:
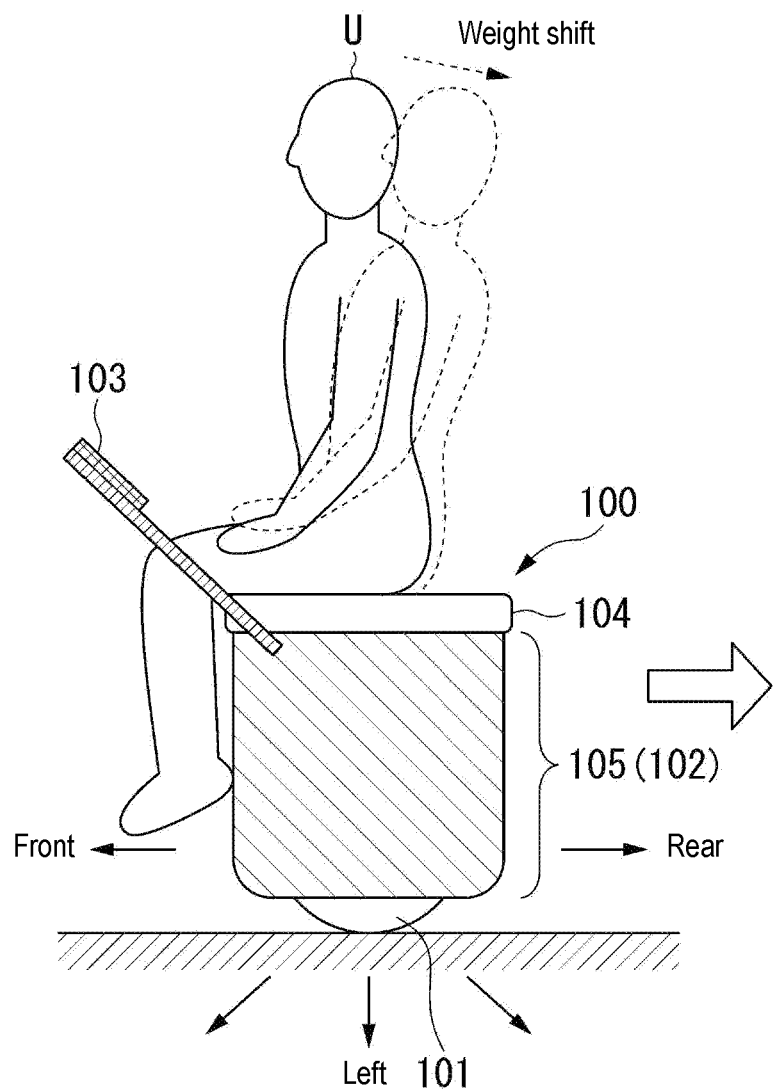
FIG. 5 is a second diagram showing an operation example of the inverted pendulum type vehicle.

FIG. 4 and FIG. 5 are diagrams showing an operation example of the inverted pendulum type vehicle 100. The inverted pendulum type vehicle 100 is equipped with an IMU sensor for detecting the balance state of the own vehicle, and the inverted pendulum type vehicle 100 is configured to balance the own vehicle based on the detection result of the IMU sensor. FIG. 4 shows a case where the user U shifts his or her weight in the right direction with the front direction of the paper as the front direction with respect to the inverted pendulum type vehicle 100 configured as described above. In this case, the inverted pendulum type vehicle 100 moves to the right in order to restore the balance lost due to the weight shift of the user U. Further, FIG. 5 shows a case where the user U shifts his or her weight in the rear direction (to the right of the paper), and in this case, the inverted pendulum type vehicle 100 moves in the rear direction in order to restore the balance. By performing such balance control, the user U may instruct the moving direction to the inverted pendulum type vehicle 100 by shifting the weight in the direction in which he or she wants to travel. Further, when the user U makes a large weight shift, the inverted pendulum type vehicle 100 is controlled to move faster in order to restore the balance. As a result, the user U may adjust the moving speed of the inverted pendulum type vehicle 100 by changing the magnitude of the weight shift of the user U.

Figure 6:
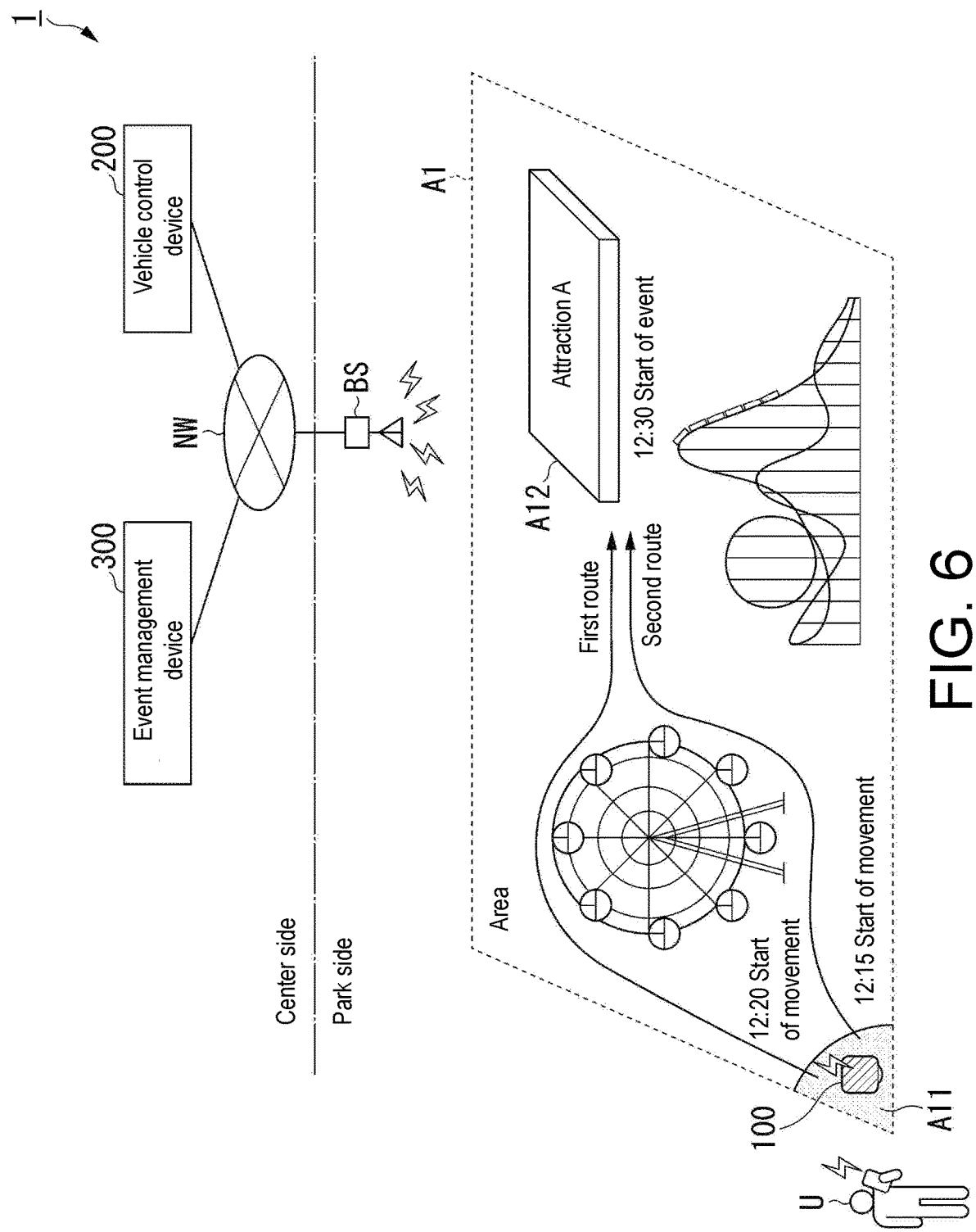
FIG. 6 is a diagram showing an outline of the vehicle control system 1 according to an embodiment.

FIG. 6 is a diagram showing an outline of the vehicle control system 1 according to an embodiment. For example, the vehicle control system 1 is used as a control system for the inverted pendulum type vehicle 100 that provides a user with a means of transportation within a park in a facility such as an amusement park or a theme park (hereinafter, simply referred to as a "park"). The vehicle control system 1 includes, for example, the inverted pendulum type vehicle 100, a vehicle control device 200, and an event management device 300. The inverted pendulum type vehicle 100 has a wireless communication function and is connected to a network NW via a wireless base station BS. The inverted pendulum type vehicle 100 may communicate with the vehicle control device 200 via the network NW. In addition, the vehicle control device 200 and the event management device 300 are disposed in a data center of the operator of the park and may communicate with the inverted pendulum type vehicle 100 moving in the park via the network NW. The network NW may be a local area network (LAN) or may include a wide area network (WAN).

The vehicle control device 200 performs a process for guiding the inverted pendulum type vehicle 100 to a predetermined destination in the park. More specifically, the vehicle control device 200 moves the inverted pendulum type vehicle 100 to the destination by automatic driving so that the inverted pendulum type vehicle 100 reaches the destination by a predetermined time. Hereinafter, the movement of the inverted pendulum type vehicle 100 by the automatic driving control of the vehicle control device 200 is referred to as "automatic movement." That is, the vehicle control device 200 guides the inverted pendulum type vehicle 100 to the destination by starting the automatic movement of the inverted pendulum type vehicle 100 at a time when the inverted pendulum type vehicle 100 may reach the destination by a predetermined time. For example, FIG. 6 shows a case where the inverted pendulum type vehicle 100 is guided from a rental place A11 to a venue A12 of an attraction A in a certain area A1 in the park by automatic movement.

Specifically, the vehicle control device 200 wirelessly communicates with the inverted pendulum type vehicle 100 via the wireless base station BS, and acquires the position information of the inverted pendulum type vehicle 100 from the inverted pendulum type vehicle 100. The vehicle control device 200 recognizes the current position of the inverted pendulum type vehicle 100 based on the acquired position information, generates control information (hereinafter referred to as "automatic movement control information") for causing the inverted pendulum type vehicle 100 to perform automatic movement based on the recognized current position, and transmits it to the inverted pendulum type vehicle 100. The inverted pendulum type vehicle 100 may reach the destination by a predetermined time by controlling the automatic movement of its own vehicle based on the automatic movement control information provided from the vehicle control device 200. The vehicle control device 200 may recognize the start time of automatic movement, the movement route, and the like based on event information separately provided from the event management device 300.

The event management device 300 manages events held in the park. More specifically, the event management device 300 provides information about an event held in the park to a user terminal device 400, which is an information processing device used by the user U of the inverted pendulum type vehicle 100, and accepts a participation reservation for an event selected by the user U from the user terminal device 400. The event management device 300 allocates the inverted pendulum type vehicle 100 as a means of transportation to the event venue to the user U who has made a participation reservation for the event, and provides the vehicle control device 200 with event information regarding the participation reservation for the event. Based on this event information, the vehicle control device 200 controls the automatic movement of the inverted pendulum type vehicle 100, so that the user U may move to the event venue by the start time of the event for which the participation reservation is made.

Figure 7:
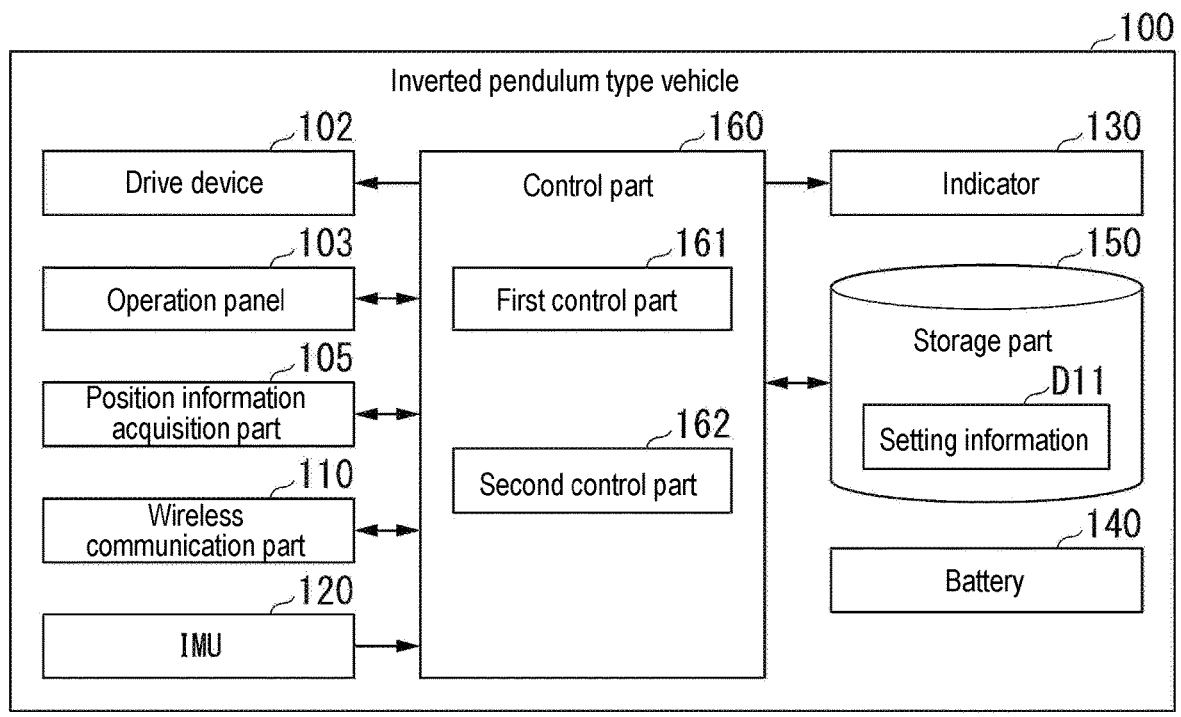
FIG. 7 is a diagram showing an example of a functional configuration of the inverted pendulum type vehicle 100 according to this embodiment.

FIG. 7 is a diagram showing an example of a functional configuration of the inverted pendulum type vehicle 100 according to this embodiment. The inverted pendulum type vehicle 100 includes, for example, a drive device 102, an operation panel 103, a position information acquisition part 105, a wireless communication part 110, an IMU 120, an indicator 130, a battery 140, a storage part 150, and a control part 160. The inverted pendulum type vehicle 100 is realized by, for example, a hardware processor such as a central processing unit (CPU) executing a program (software). In addition, some or all of these components may be realized by hardware (a circuit part, including circuitry) such as a large scale integration (LSI), an application specific integrated circuit (ASIC), a field-programmable gate array (FPGA), a graphics processing unit (GPU) and the like, or may be realized by the cooperation of software and hardware. The program may be stored in advance in a storage device such as the storage part 150 (a storage device including a non-transient storage medium), or may be stored in a removable storage medium such as a DVD or a CD-ROM, and may be installed in the storage part 150 of the inverted pendulum type vehicle 100 or the like by attaching the storage medium (non-transient storage medium) to the drive device.

The drive device 102 and the operation panel 103 are as described above. The drive device 102 drives the omnidirectional moving wheel 101 under the control of the control part 160. The operation panel 103 receives an input operation for the inverted pendulum type vehicle 100 and outputs it to the control part 160, and also outputs information such as image and sound output by the control part 160. The operation panel 103 is an example of an "output part," an "operation input part," and a "setting input part." The position information acquisition part 105 includes, for example, a global positioning system (GPS) transmitter, acquires the position information of the own vehicle, and provides it to the vehicle control device 200.

The wireless communication part 110 is a communication interface for connecting the inverted pendulum type vehicle 100 to the network NW. The wireless communication part 110 communicates with the vehicle control device 200 via the network NW. The wireless communication part 110 may be a wireless local area network (LAN) interface based on Wi-Fi (registered trademark), Bluetooth (registered trademark), or the like, or may be a wide area network (WAN) interface connected to a cellular network, a dedicated line, or the like.

The inertial measurement unit (IMU) 120 is a sensor that detects a three-dimensional inertial motion. The IMU 120 includes an acceleration sensor that detects translational motion, a gyro sensor that detects rotational motion, and the like.

The indicator 130 is a device such as a sign, a meter, a display, a pointer, an index, and the like, and is a device for indicating decorations related to the state of the inverted pendulum type vehicle 100 and the user U. The indicator 130 is an example of an "output part."

The battery 140 functions as a power supply for supplying power to each part of the inverted pendulum type vehicle 100. As the battery 140, for example, a rechargeable storage battery such as a lithium ion battery, a nickel hydrogen battery, or a nickel cadmium battery is used. The battery 140 may be fixed to the inverted pendulum type vehicle 100 or may be detachable from the inverted pendulum type vehicle 100.

The storage part 150 is a storage device such as a hard disk drive (HDD), a solid state drive (SSD), a flash memory, or the like. The storage part 150 stores various setting information D11 related to the control of the inverted pendulum type vehicle 100.

The control part 160 controls the operation of the inverted pendulum type vehicle 100. The control part 160 includes, for example, a first control part 161 and a second control part 162. The first control part 161 recognizes the driving operation due to the weight shift of the user U under the balance control based on the detection result of the IMU 120, and controls the operation of the omnidirectional moving wheel 101 so as to move in the direction of the detected weight shift at a speed corresponding to the magnitude of the weight movement. As a result, the user U may operate the inverted pendulum type vehicle 100 by the driving operation as described with reference to FIGS. 4 and 5.

The second control part 162 operates in cooperation with the first control part 161 based on the automatic movement control information received from the vehicle control device 200, and controls the automatic movement of the own vehicle so that the own vehicle may reach a predetermined destination by a predetermined time. For example, the second control part 162 receives information indicating a movement direction, a movement speed, a movement target, a direction of the own vehicle, and the like as automatic movement control information for causing the own vehicle to perform automatic movement to the destination from the vehicle control device 200. The second control part 162 determines the operation amount required to make the own vehicle travel in the mode notified by the automatic movement control information for each functional part of the own vehicle, and operates each functional part with the determined operation amount, whereby the own vehicle may be made to perform automatic movement. The second control part is an example of a "movement control part."

When the own vehicle performs automatic movement under the control of the second control part 162, the first control part 161 basically disables the driving operation by the weight shift of the user U. Here, basically, the first control part 161 enables the driving operation by the weight shift of the user U when a predetermined enabling condition (to be described later) is satisfied.

Figure 8:
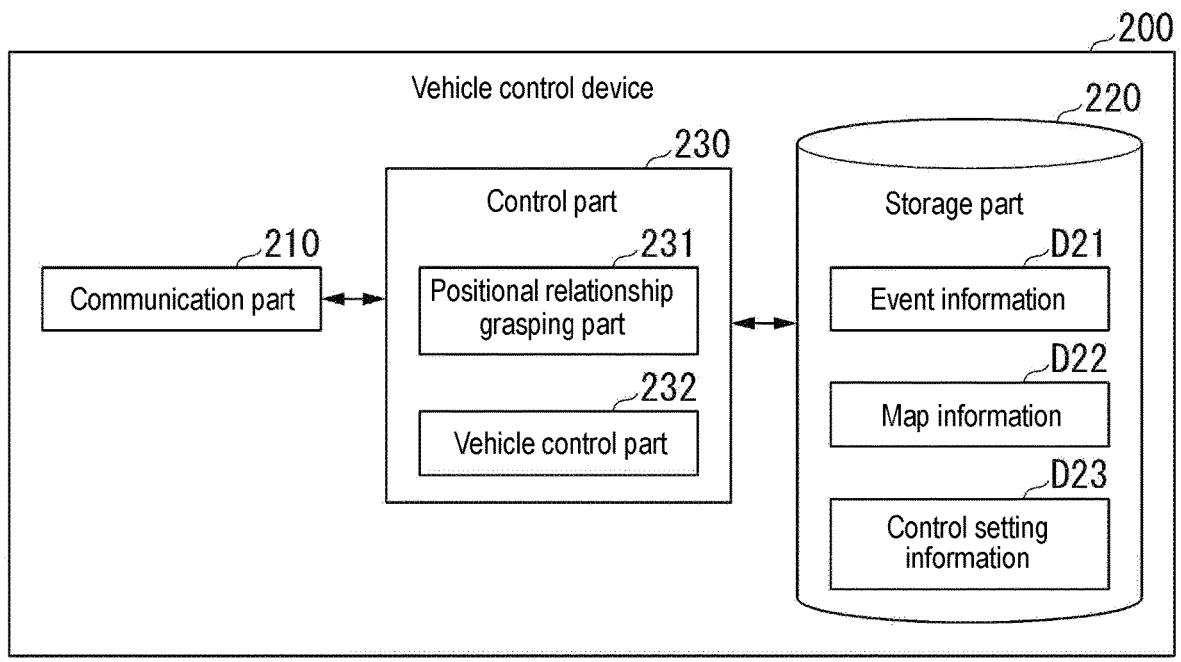
FIG. 8 is a diagram showing an example of a functional configuration of the vehicle control device 200 according to this embodiment.

FIG. 8 is a diagram showing an example of a functional configuration of the vehicle control device 200 according to this embodiment. The vehicle control device 200 includes, for example, a communication part 210, a storage part 220, and a control part 230. The vehicle control device 200 is realized by, for example, a hardware processor such as a CPU executing a program (software). In addition, some or all of these components may be realized by hardware (a circuit part, including circuitry) such as a LSI, an ASIC, a FPGA, a GPU and the like, or may be realized by the cooperation of software and hardware. The program may be stored in advance in a storage device such as the storage part 150 (a storage device including a non-transient storage medium), or may be stored in a removable storage medium such as a DVD or a CD-ROM, and may be installed in the storage part 220 of the vehicle control device 200 or the like by attaching the storage medium (non-transient storage medium) to the drive device.

The communication part 210 is a communication interface for connecting the vehicle control device 200 to the network NW. The communication part 210 communicates with the inverted pendulum type vehicle 100 and the event management device 300 via the network NW.

The storage part 220 is a storage device such as a HDD, a SSD, a flash memory, or the like. The storage part 220 stores various information related to the operation of the vehicle control device 200. For example, the storage part 220 stores, for each inverted pendulum type vehicle 100, event information D21 provided from the event management device 300, map information D22 in the park, control setting information D23 which is setting information related to the automatic movement control, and the like.

The control part 230 performs a process for causing the inverted pendulum type vehicle 100 to perform automatic movement to the destination. The control part 230 includes, for example, a positional relationship grasping part 231 and a vehicle control part 232. The positional relationship grasping part 231 acquires position information from the inverted pendulum type vehicle 100, and grasps various positional relationships of the inverted pendulum type vehicle 100 in the park based on the acquired position information. For example, the positional relationship grasping part 231 recognizes the positions of the inverted pendulum type vehicles 100 in the park, and also recognizes the surrounding environment of each inverted pendulum type vehicle 100 based on the map information in the park and the detection information of people, obstacles, and the like in the park. Based on such a recognition result, the positional relationship grasping part 231 is configured to grasp the positional relationship between the inverted pendulum type vehicles 100 and the positional relationship between each inverted pendulum type vehicle 100 and the surrounding environment.

The vehicle control part 232 controls the movement mode so that each inverted pendulum type vehicle 100 performs automatic movement to the destination based on various positional relationships grasped about the inverted pendulum type vehicle 100. More specifically, the vehicle control part 232 controls each inverted pendulum type vehicle 100 so that each inverted pendulum type vehicle 100 starts automatic movement at a movement start time set for each and moves to a destination on a predetermined route. The movement route to the destination is not limited to one, and when there are multiple movement route candidates, the vehicle control part 232 may be configured to control automatic movement for the movement route selected by the user U.

Figure 9:
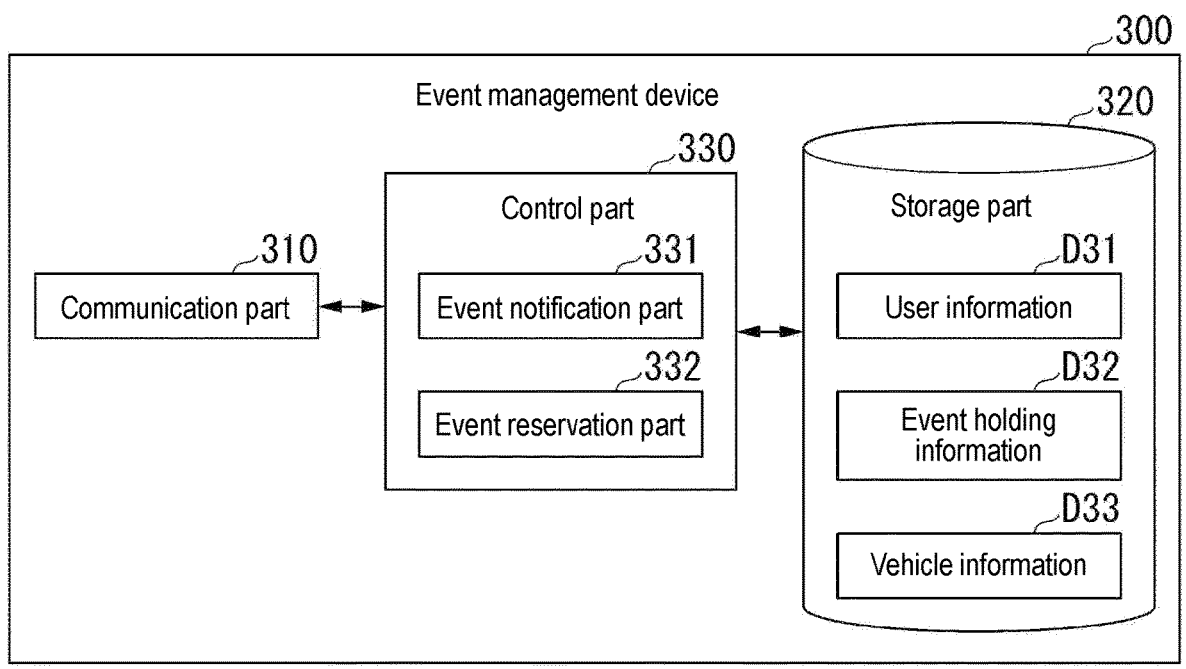
FIG. 9 is a diagram showing an example of a functional configuration of the event management device 300 according to this embodiment.

FIG. 9 is a diagram showing an example of a functional configuration of the event management device 300 according to this embodiment. The event management device 300 includes, for example, a communication part 310, a storage part 320, and a control part 330. The event management device 300 is realized by, for example, a hardware processor such as a CPU executing a program (software). In addition, some or all of these components may be realized by hardware (a circuit part, including circuitry) such as a LSI, an ASIC, a FPGA, a GPU and the like, or may be realized by the cooperation of software and hardware. The program may be stored in advance in a storage device such as the storage part 320 (a storage device including a non-transient storage medium), or may be stored in a removable storage medium such as a DVD or a CD-ROM, and may be installed in the storage part 320 of the event management device 300 or the like by attaching the storage medium (non-transient storage medium) to the drive device.

The communication part 310 is a communication interface for connecting the event management device 300 to the network NW. The communication part 310 communicates with the inverted pendulum type vehicle 100 and the vehicle control device 200 via the network NW.

The storage part 320 is a storage device such as a HDD, a SSD, a flash memory, or the like. The storage part 320 stores various information related to the operation of the event management device 300. For example, the storage part 320 stores user information D31 related to the user U, event holding information D32 regarding the holding of an event, vehicle information D33 regarding the allottable inverted pendulum type vehicle 100, and the like.

The control part 330 has a function of providing information on an event held in the park to the user U and accepting an application for a participation reservation for the event from the user U. Specifically, the control part 330 includes, for example, an event notification part 331 and an event reservation part 332. The event notification part 331 has a function of determining an event to be notified to the user U and notifying the determined event to the user terminal device 400. More specifically, the event notification part 331 notifies the user terminal device 400 of an event according to the preference of the user U based on the preference information of the user U registered in advance. Here, it is assumed that the preference information is registered in the storage part 320 in advance as a part of the user information. For example, the mode selected by the user U from the viewing modes set by the business operator such as "recommended tour mode," "annual pass-free mode," "character greeting mode," and "attraction ride mode" may be registered as preference information.

The event reservation part 332 has a function of accepting an application for participation reservation of the user U for the event notified by the event notification part 331. If there is a vacancy in the number of people who may participate in the event, the event reservation part 332 confirms the participation reservation for which the application has been accepted, and allocates the inverted pendulum type vehicle 100 as a means of transportation to the event venue for the user U who has confirmed the reservation. The event reservation part 332 notifies the user terminal device 400 of the event information regarding the confirmed participation reservation.

For example, the user U recognizes that the participation reservation has been confirmed by confirming the event information notified, heads to the rental place of the inverted pendulum type vehicle 100 in the park at the reserved date and time, and receives the rental of the inverted pendulum type vehicle 100 allocated to himself or herself. The user U gets on the rented inverted pendulum type vehicle 100 and waits for the start of automatic movement. For example, in the case of the example of FIG. 6, the user U receives the rental of the inverted pendulum type vehicle 100 by 12:15, which is the start time of the automatic movement, selects one of a first route and a second route, and waits for the start of automatic movement. For example, the display of the selectable movement route and the operation of selecting the movement route are performed via the operation panel 103. When the start time of the automatic movement arrives, the user U gets on the inverted pendulum type vehicle 100 and starts moving toward the destination attraction A by automatic movement.

Hereinafter, some specific examples of the control method of the inverted pendulum type vehicle 100 during the execution of automatic movement will be described.

Figure 10:
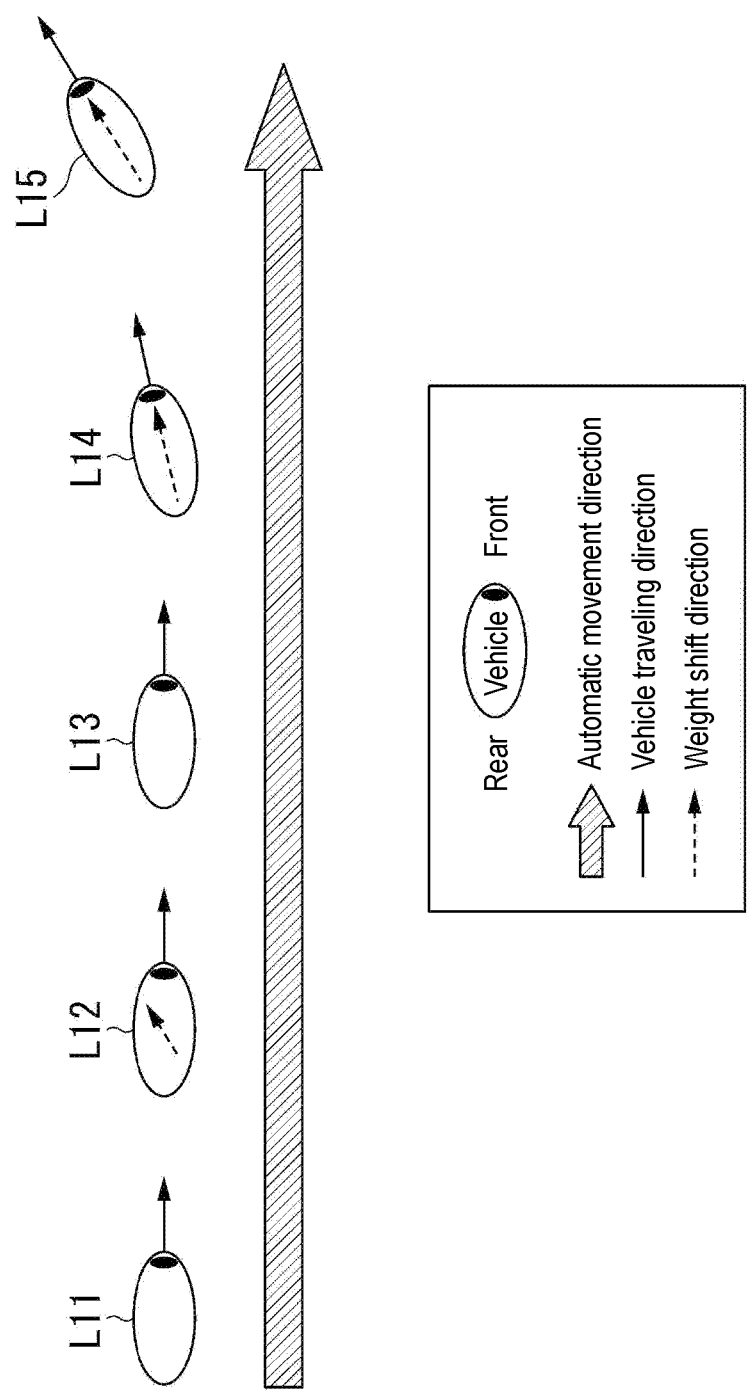
FIG. 10 is a first diagram illustrating a first control method for controlling the inverted pendulum type vehicle according to this embodiment.

FIG. 10 is a diagram illustrating a first control method for controlling the inverted pendulum type vehicle 100 according to this embodiment. Specifically, the first control method is a control for enabling the driving operation of the inverted pendulum type vehicle 100 by the weight shift of the user U when a first enabling condition is satisfied. Here, the first enabling condition is that the direction of the weight shift is not the direction of the movement path by automatic movement (hereinafter referred to as "automatic movement direction"), and the magnitude of the weight shift is greater than or equal to a threshold value. Specifically, FIG. 10 shows a case where the driving operation by the weight shift of the user U is input while the inverted pendulum type vehicle 100 is traveling in the traveling direction of the automatic movement. In FIG. 10, the dashed arrow drawn inside the body of the inverted pendulum type vehicle 100 indicates the weight shift of the user U. The direction of the dashed arrow indicates the direction of the weight shift, and the length of the dashed arrow indicates the magnitude of the weight shift. Specifically, in the example of FIG. 10, the user U performs a weight shift of a magnitude less than the threshold value at the point L12, and performs a weight shift of a magnitude greater than or equal to the threshold value at and after the point L14.

In this case, the first control part 161 disables the driving operation by weight shift at the point L12 because the magnitude thereof is less than the threshold value. That is, in this case, the inverted pendulum type vehicle 100 moves in the automatic movement direction without changing the traveling direction at the point L12. In addition, the first control part 161 enables the driving operation by weight shift at and after the point L14 because the magnitude thereof is greater than or equal to the threshold value. That is, in this case, the inverted pendulum type vehicle 100 changes the traveling direction and moves in the direction of operation by the enabled driving operation at and after the point L14.

According to such a first control method, the vehicle control system 1 may basically guide the user U to the destination by automatic movement while allowing the user U to freely operate the inverted pendulum type vehicle 100 to some extent.

Figure 11:
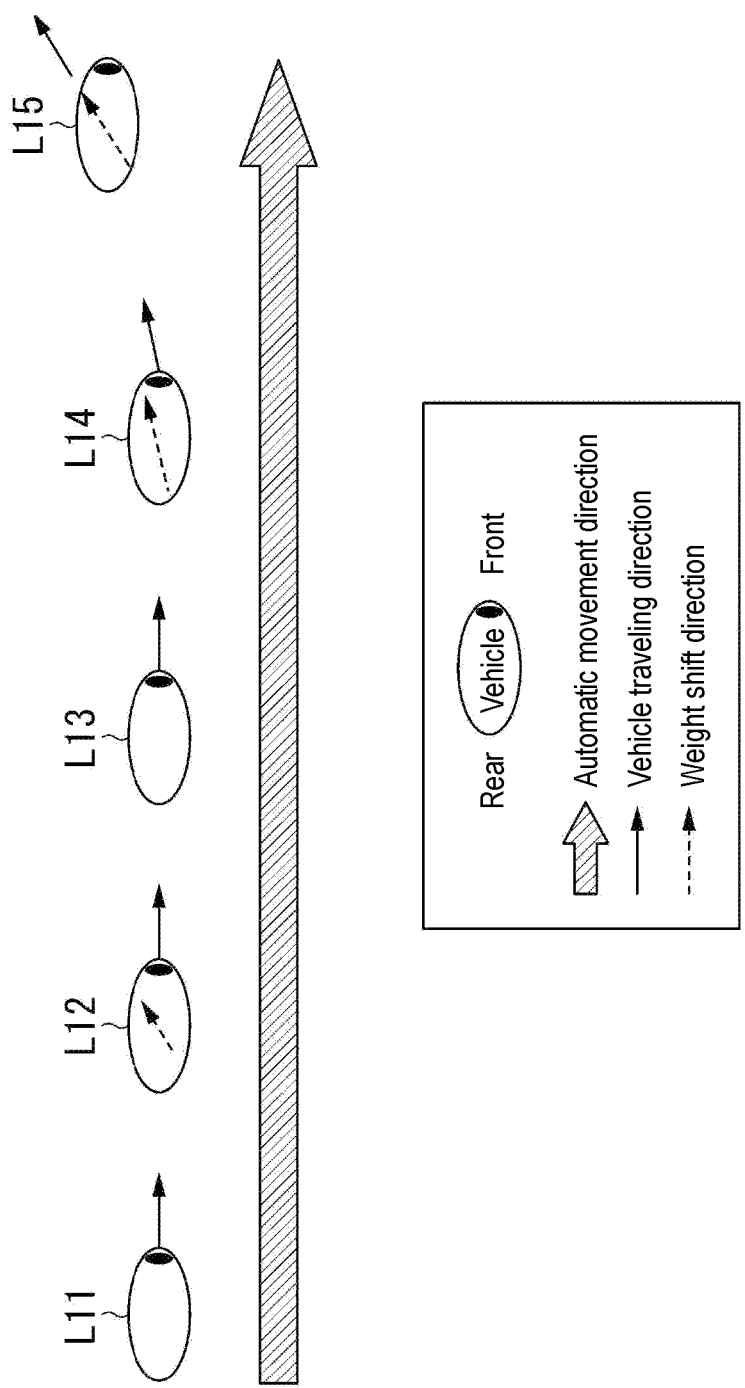
FIG. 11 is a second diagram illustrating the first control method for controlling the inverted pendulum type vehicle according to this embodiment.

In the first control method, when the driving operation by weight shift is enabled, the mode in which the inverted pendulum type vehicle 100 changes the traveling direction in the direction of weight shift is not limited to the mode in which the front of the vehicle is directed in the direction of weight shift as shown in FIG. 10. For example, as shown in FIG. 11, the first control part 161 may change only the traveling direction to the weight shift direction while keeping the front of the vehicle facing the automatic movement direction. This is made possible by the inverted pendulum type vehicle 100 provided with the omnidirectional moving wheel 101.

Further, in the first control method, when the user U ends the driving operation by weight shift, the second control part 162 may be configured to return the own vehicle deviated from the movement path by the automatic movement to the movement route by the automatic movement by cooperating with the first control part 161.

Figure 12:
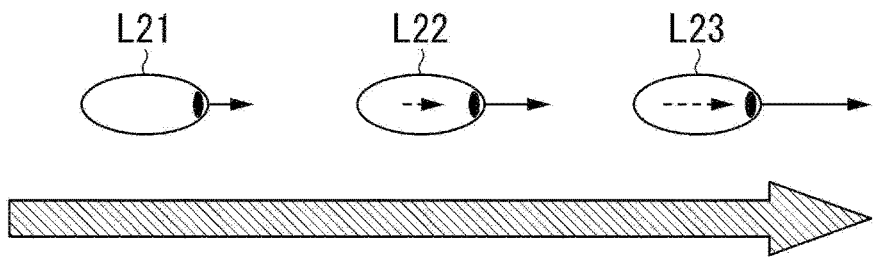
FIG. 12 is a diagram illustrating a second control method for controlling the inverted pendulum type vehicle according to this embodiment.
Figure 12:
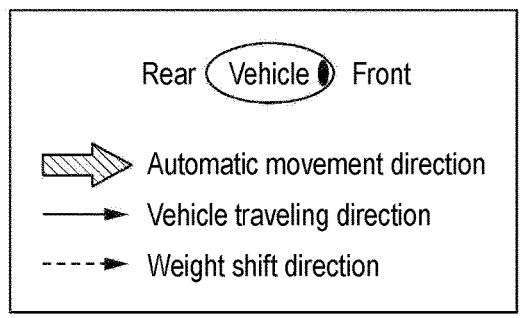

FIG. 12 is a diagram illustrating a second control method for controlling the inverted pendulum type vehicle 100 according to this embodiment. Specifically, the second control method is a control for enabling the driving operation of the inverted pendulum type vehicle 100 by the weight shift of the user U when a second enabling condition is satisfied. Here, the second enabling condition is that the direction of weight shift is the automatic movement direction. Specifically, FIG. 12 shows a case where the driving operation by the weight shift of the user U is input while the inverted pendulum type vehicle 100 is traveling in the traveling direction of the automatic movement. In FIG. 12, the dashed arrow drawn inside the body of the inverted pendulum type vehicle 100 indicates the weight shift of the user U, as in FIGS. 10 and 11. That is, the direction of the dashed arrow indicates the direction of the weight shift, and the length of the dashed arrow indicates the magnitude of the weight shift. Specifically, in the example of FIG. 12, the user U performs a certain amount of weight shift in the automatic movement direction at the point L22, and performs a larger weight shift in the automatic movement direction at and after the point L23.

In this case, when the second enabling condition is satisfied, the first control part 161 further assists the movement of the inverted pendulum type vehicle 100 in the automatic movement direction according to the magnitude of the weight shift. More specifically, when the second enabling condition is satisfied, the first control part 161 facilitates the movement of the inverted pendulum type vehicle 100 in the automatic movement direction as compared with the case where the second enabling condition is not satisfied. For example, in the example of FIG. 12, the first control part 161 assists the traveling of the inverted pendulum type vehicle 100 so that the speed of the inverted pendulum type vehicle 100 at the point L22 is higher than the speed at the point L21. Further, the first control part 161 further assists the traveling of the inverted pendulum type vehicle 100 so that the speed of the inverted pendulum type vehicle 100 at the point L23 is even higher than the speed at the point L22.

According to such a second control method, the vehicle control system 1 basically guides the user U to the destination by automatic movement while enabling the user U to adjust the movement speed in the automatic movement direction by a driving operation.

In the example of FIG. 12, the case where the first control part 161 assists the traveling of the inverted pendulum type vehicle 100 in the automatic movement direction has been described, but conversely, the first control part 161 may be configured to slow down the movement speed of the inverted pendulum type vehicle 100 in the automatic moving direction according to the magnitude of the weight shift when the weight shift is performed in the opposite direction to the automatic movement direction.

Further, the second enabling condition may be that the direction of the weight shift is the automatic movement direction and that the magnitude of the weight shift is greater than or equal to the threshold value at the same time. By adding the condition related to the magnitude of the weight shift to the second enabling condition in this way, it is possible to suppress the traveling speed of the inverted pendulum type vehicle 100 from being finely increased or decreased due to the small weight shift.

Figure 13:
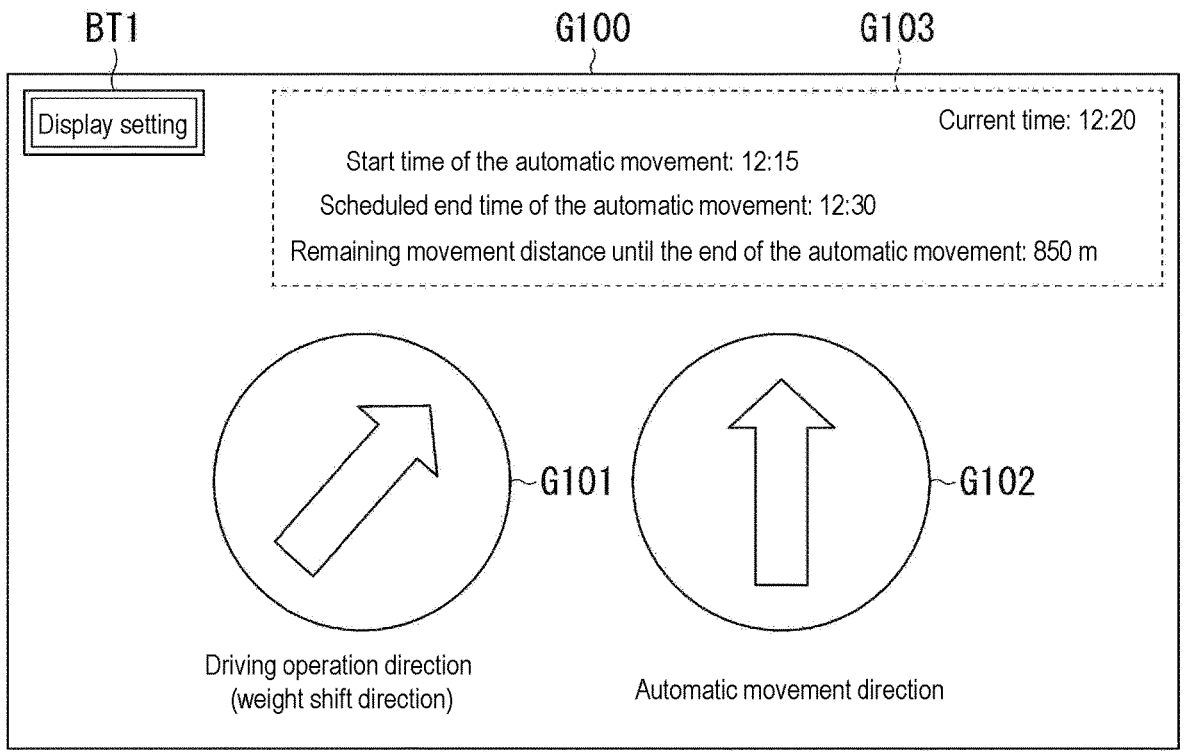
FIG. 13 is a diagram illustrating a third control method for controlling the inverted pendulum type vehicle according to this embodiment.

FIG. 13 is a diagram illustrating a third control method for controlling the inverted pendulum type vehicle 100 according to this embodiment. Specifically, the third control method is to notify the user U that the own vehicle is automatically moving by generating information (hereinafter referred to as "notification information") indicating that the own vehicle is automatically moving during the automatic movement of the inverted pendulum type vehicle 100 and displaying it on a display part or the like of the operation panel 103. More specifically, the second control part 162 causes the display part to display, as one of the notification information, the traveling direction of the inverted pendulum type vehicle 100 operated by the weight shift by the user U (hereinafter referred to as "driving operation direction") and the automatic movement direction in different modes. A screen G100 shown in FIG. 13 includes a first region G101 indicating the automatic movement direction and a second region G102 indicating the driving operation direction, and is displayed on, for example, the operation panel 103. In this way, during the automatic movement of the inverted pendulum type vehicle 100, the automatic movement direction and the driving operation direction are displayed to be distinguishable, so that the user U may operate the inverted pendulum type vehicle 100 while recognizing the validity of the traveling direction with respect to his or her own driving operation for the inverted pendulum type vehicle 100 on which the user U is riding.

Further, in addition to the above information, the second control part 162 may be configured to display, as one of the notification information, the end time of the automatic movement and the remaining distance that the own vehicle travels until the end of the automatic movement. For example, the screen G100 shown in FIG. 13 includes a third area G103 showing the current time, the start time of the automatic movement, the scheduled end time of the automatic movement, and the remaining movement distance until the end of the automatic movement. Further, BT1 is a button for displaying a display setting screen G200 (see FIG. 14) for changing the display setting of the notification information.

The above notification information may be output by a device other than the display device such as the operation panel 103. For example, the second control part 162 may be configured to output by an external notification part such as an indicator 130 or a lamp (not shown). Further, when the inverted pendulum type vehicle 100 is provided with an image projection device such as a projector, the second control part 162 may be configured notify the user U of the notification information by projecting the notification information on the floor surface or the like by the image projection device. Further, the inverted pendulum type vehicle 100 may transmit the notification information to the user terminal device 400 to display the notification information on the user terminal device 400. Further, when the inverted pendulum type vehicle 100 includes a vibrator such as a motor that generates vibration, the second control part 162 may be configured to convey the notification information as a vibration pattern by the vibrator. Further, when the inverted pendulum type vehicle 100 is provided with a speaker, the second control part 162 may be configured to output an audio indicating the notification information by the speaker.

By outputting the notification information in such an manner, the inverted pendulum type vehicle 100 may notify the user U of the own vehicle or a person in the vicinity of the traveling state of the own vehicle, and thus it is possible to suppress the chaos of the traffic environment around the own vehicle.

Further, the display of the automatic movement direction and the driving operation direction may be made so that the user U may easily visually identified them by different display colors, display patterns, and the like.

Figure 14:
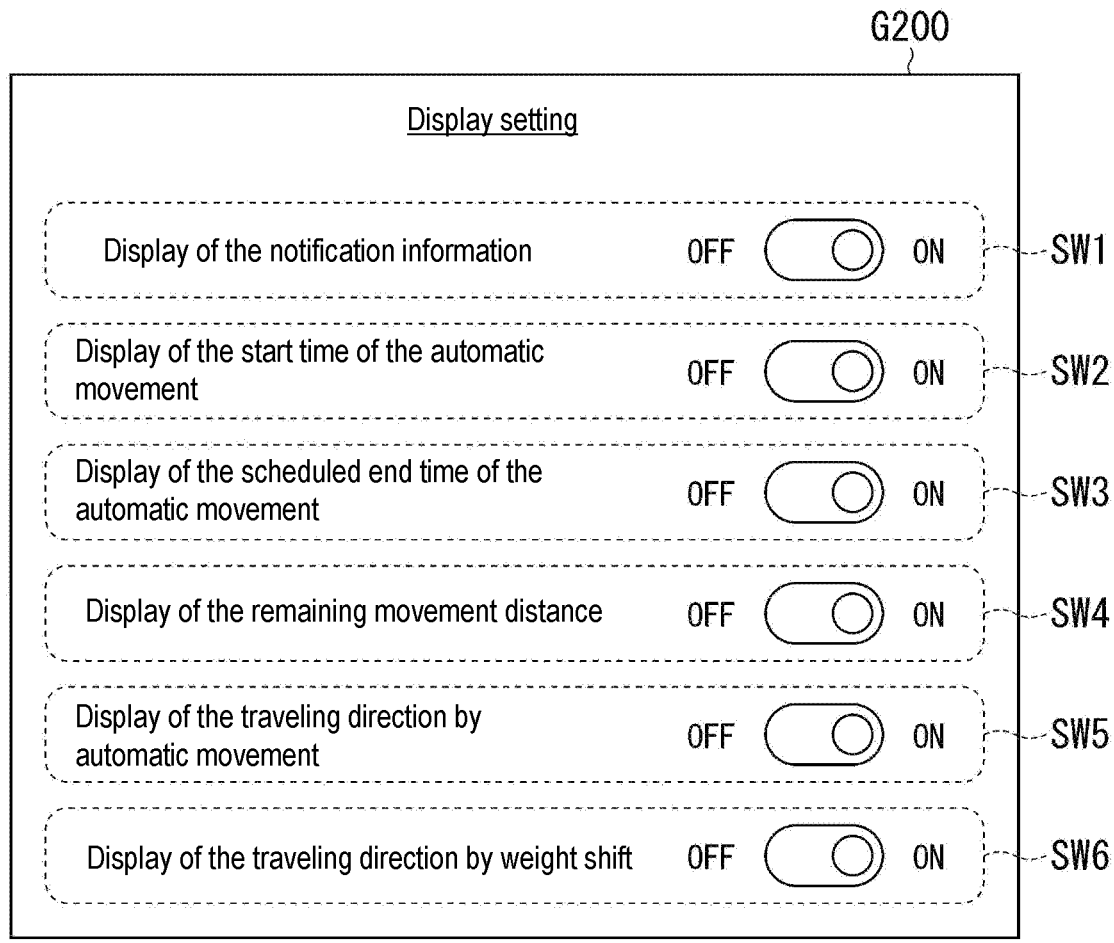
FIG. 14 is a diagram illustrating the fourth control method for controlling the inverted pendulum type vehicle according to this embodiment.

FIG. 14 is a diagram illustrating a fourth control method for controlling the inverted pendulum type vehicle 100 according to this embodiment. Specifically, the fourth control method hides a part or all of the notification information based on the setting information registered in advance. In this case, the second control part 162 receives the input of the setting information via the operation panel 103, and hides a part or all of the notification information according to the input setting information. FIG. 14 shows a display setting screen G200 for displaying a switch SW1 for switching on/off of the display of the entire notification information, a switch SW2 for individually switching on/off of the display of the start time of automatic movement, a switch SW3 for individually switching on/off of the display of the scheduled end time of automatic movement, a switch SW4 for individually switching on/off of the display of the remaining movement distance in the automatic movement, a switch SW5 for individually switching on/off of the display of the automatic movement direction, and a switch SW6 for individually switching on/off of the display of the driving operation direction. For example, the display setting screen G200 is displayed by pressing the button BT1 in FIG. 13. For example, the second control part 162 includes the content of the display setting by the display setting screen G200 in the setting information D11 and registers it in the storage part 150, and changes the display of the screen G100 based on the content of the registered display setting. As a result, the user U may switch on/off of the display for a part or all of the notification information displayed during the automatic movement.

In the vehicle control system 1 of the embodiment configured in this way, the inverted pendulum type vehicle 100 that travels while balancing the inverted pendulum type body includes the operation panel 103 that receives a driving operation of the own vehicle by the weight shift of an occupant, and the second control part 162 for causing the own vehicle to start automatic movement on a predetermined route at a predetermined time. The second control part 162 is configured to allow the own vehicle to deviate from the predetermined route by the automatic movement and travel in a second direction when a weight shift greater than the threshold value is performed in a direction (second direction) other than the traveling direction related to the predetermined route during the execution of the automatic movement. By providing such a configuration, according to the vehicle control system 1 of the embodiment, it is possible to allow the occupant to operate the vehicle as needed for the vehicle that performs automatic movement to the destination.

In the above embodiment, the vehicle control system 1 that controls the automatic movement of the inverted pendulum type vehicle 100 in the park has been described. However, the vehicle control system 1 is also applicable to a case where the target of automatic movement is a moving object other than the inverted pendulum type vehicle 100.

The embodiments described above may be expressed as follows.

An inverted pendulum type vehicle that travels while balancing an inverted pendulum type body includes:
a storage device that stores a program; and
a hardware processor, and
by executing the program by the hardware processor, the inverted pendulum type vehicle performs:
receiving a driving operation of its own vehicle by a weight shift of an occupant;
performing a movement control process that causes the own vehicle to start automatic movement on a predetermined route at a predetermined time; and
in the movement control process, allowing the own vehicle to deviate from the predetermined route and travel in a second direction when a weight shift greater than a threshold value is performed in the second direction other than a traveling direction related to the predetermined route during execution of the automatic movement.

Although the modes for implementing the disclosure have been described above using the embodiments, the disclosure is not limited to these embodiments, and various modifications and replacements may be made without departing from the gist of the disclosure.

What is claimed is:

1. An inverted pendulum type vehicle that travels while balancing an inverted pendulum type body, the inverted pendulum type vehicle comprising:
an inertial measurement unit (IMU) that detects a three-dimensional inertial motion of its own vehicle; and
a hardware processor configured to:
recognize a driving operation of the own vehicle by a weight shift of an occupant under a balance control based on a detection result of the IMU; and
cause the own vehicle to start automatic movement on a predetermined route to a destination at a predetermined time, wherein
the hardware processor controls a moving wheel of the own vehicle to travel in a second direction in response to the weight shift in the second direction other than a traveling direction related to the predetermined route during execution of the automatic movement being greater than a threshold value.

2. The inverted pendulum type vehicle according to claim 1, wherein the hardware processor facilitates a movement in the traveling direction when the weight shift is performed in the traveling direction during the execution of the automatic movement as compared with a case where the weight shift is not performed in the traveling direction during the execution of the automatic movement.

3. The inverted pendulum type vehicle according to claim 1, wherein the hardware processor further outputs information in a predetermined mode, and
wherein when the own vehicle is executing the automatic movement, the hardware processor outputs notification information for notifying the user of the own vehicle to that effect.

4. The inverted pendulum type vehicle according to claim 2, wherein the hardware processor further outputs information in a predetermined mode, and wherein when the own vehicle is executing the automatic movement, the hardware processor outputs notification information for notifying the user of the own vehicle to that effect.

5. The inverted pendulum type vehicle according to claim 3, wherein the hardware processor causes a display to display, as one of the notification information, a direction of the weight shift and a direction of a movement route by the automatic movement in different modes.

6. The inverted pendulum type vehicle according to claim 4, wherein the hardware processor causes a display to display, as one of the notification information, a direction of the weight shift and a direction of a movement route by the automatic movement in different modes.

7. The inverted pendulum type vehicle according to claim 3, wherein the hardware processor causes a display to display, as one of the notification information, an end timing of the automatic movement and a remaining distance that the own vehicle travels until an end of the automatic movement.

8. The inverted pendulum type vehicle according to claim 4, wherein the hardware processor causes a display to display, as one of the notification information, an end timing of the automatic movement and a remaining distance that the own vehicle travels until an end of the automatic movement.

9. The inverted pendulum type vehicle according to claim 5, wherein the hardware processor causes the display to display, as one of the notification information, an end timing of the automatic movement and a remaining distance that the own vehicle travels until an end of the automatic movement.

10. The inverted pendulum type vehicle according to claim 6, wherein the hardware processor causes the display to display, as one of the notification information, an end timing of the automatic movement and a remaining distance that the own vehicle travels until an end of the automatic movement.

11. The inverted pendulum type vehicle according to claim 3, wherein the hardware processor further receives an input of an operation for setting whether to cause a display to display a part or all of the notification information,
wherein the movement control part switches whether to cause the display to display a part or all of the notification information according to the input of the operation.

12. The inverted pendulum type vehicle according to claim 4, wherein the hardware processor further receives an input of an operation for setting whether to cause a display to display a part or all of the notification information,
wherein the movement control part switches whether to cause the display to display a part or all of the notification information according to the input of the operation.

13. The inverted pendulum type vehicle according to claim 5, wherein the hardware processor further receives an input of an operation for setting whether to cause the display to display a part or all of the notification information,
wherein the movement control part switches whether to cause the display to display a part or all of the notification information according to the input of the operation.

14. The inverted pendulum type vehicle according to claim 6, wherein the hardware processor further receives an input of an operation for setting whether to cause the display to display a part or all of the notification information,
wherein the movement control part switches whether to cause the display to display a part or all of the notification information according to the input of the operation.

15. The inverted pendulum type vehicle according to claim 7, wherein the hardware processor further receives an input of an operation for setting whether to cause the display to display a part or all of the notification information,
wherein the hardware processor switches whether to cause the display to display a part or all of the notification information according to the input of the operation.

16. The inverted pendulum type vehicle according to claim 8, wherein the hardware processor further receives an input of an operation for setting whether to cause the display to display a part or all of the notification information,
wherein the hardware processor switches whether to cause the display to display a part or all of the notification information according to the input of the operation.

17. The inverted pendulum type vehicle according to claim 9, wherein the hardware processor further receives an input of an operation for setting whether to cause the display to display a part or all of the notification information,
wherein the hardware processor switches whether to cause the display to display a part or all of the notification information according to the input of the operation.

18. A vehicle control system, comprising:
a second hardware processor configured to:
notify a user of an event;
receive a participation reservation of the user for the notified event; and
the inverted pendulum type vehicle according to claim 1,
wherein the hardware processor causes the own vehicle to start automatic movement on the predetermined route at the predetermined time according to a holding time of the event, and
the hardware processor notifies the user of an event according to a preference of the user based on preference information of the user registered in advance.

19. A vehicle control method for an inverted pendulum type vehicle that travels while balancing an inverted pendulum type body, the vehicle control method comprising:
detecting a three-dimensional inertial motion of its own vehicle by using an inertial measurement unit (IMU);
recognizing a driving operation of the own vehicle by a weight shift of an occupant under a balance control based on a detection result of the IMU;
performing a movement control process that causes the own vehicle to start automatic movement on a predetermined route to a destination at a predetermined time; and
in the movement control process, controlling a moving wheel of the own vehicle to travel in a second direction in response to the weight shift in the second direction other than a traveling direction related to the predetermined route during execution of the automatic movement being greater than a threshold value.

20. A non-transient computer-readable recording medium, recording a program which causes an inverted pendulum type vehicle that travels while balancing an inverted pendulum type body to perform:
detecting a three-dimensional inertial motion of its own vehicle by using an inertial measurement unit (IMU);
recognizing a driving operation of the own vehicle by a weight shift of an occupant under a balance control based on a detection result of the IMU;
performing a movement control process that causes the own vehicle to start automatic movement on a predetermined route to a destination at a predetermined time;

and in the movement control process, controlling a moving wheel of the own vehicle to travel in a second direction in response to the weight shift in the second direction other than a traveling direction related to the predetermined route during execution of the automatic movement being greater than a threshold value.

\* \* \* \* \*